March 13, 1945. R. L. BOWMAN 2,371,422
SUGAR BEET HARVESTER AND TOPPER
Filed May 17, 1943

Inventor
Robert L. Bowman
By Williamson & Williamson
Attorneys

Patented Mar. 13, 1945

2,371,422

UNITED STATES PATENT OFFICE 2,371,422

SUGAR BEET HARVESTER AND TOPPER

Robert L. Bowman, Chaska, Minn.

Application May 17, 1943, Serial No. 487,288

5 Claims. (Cl. 55—108)

This invention relates to sugar beet harvesters and toppers. Certain types of sugar beet harvesters are in use today which include means for plowing the beet from the ground, topping it and delivering it to a mobile container which moves along with the plow. However, the beets are, of course, not only not the same size but they may be lifted different distances from the ground insofar as the top of the beets are concerned so that the topping of the beets is not uniform. Additionally, present means for plowing up and delivering the beets to the wagon or other movable container involves the picking up of clods of earth which are delivered in considerable quantity to the wagon so that a large percentage of the load is made up of earth.

It is a general object of my invention to provide a sugar beet harvester which will remove the beets from the ground, top them and discharge them in such a way that no clods of earth are picked up and the topping operation is uniformly performed.

A more specific object of the invention is to provide means in conjunction with the customary uprooting plow wherein the plow partially removes the beet from the ground and a pickup device pierces the upper soft portion of the beet and also enters the hard upper crown of the beet so that the beet is firmly engaged and carried to the topping mechanism.

A further object of the invention is to provide means for insuring substantially uniform penetration of the sugar beet tops by the pickup mechanism so that when the beets are carried to the topping knife the tops will be cut off with a desired degree of regularity.

These and other objects and advantages of the invention will more fully appear from the following description made in connection with the accompanying drawing wherein like reference characters refer to the same parts throughout the views, and, in which.

Figure 1:
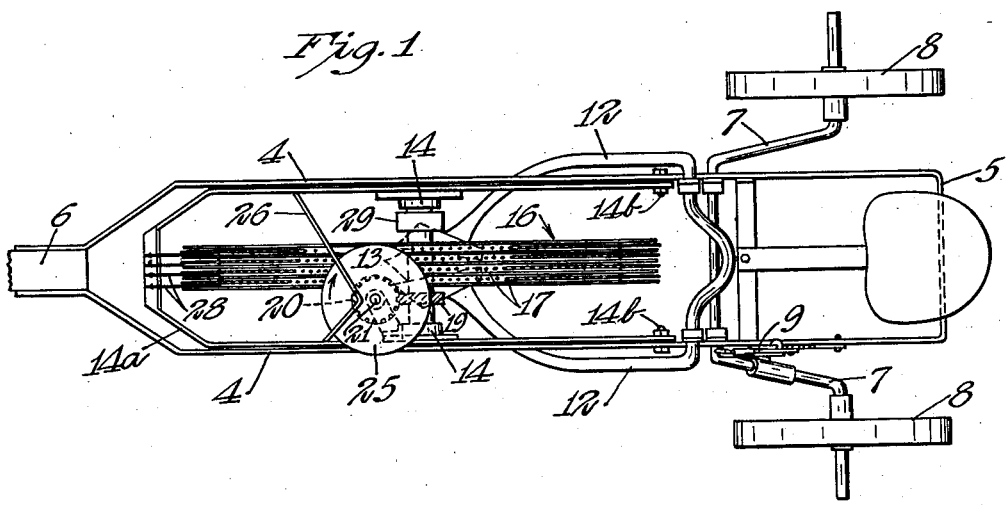
Fig. 1 is a plan view of the device.
Figure 2:
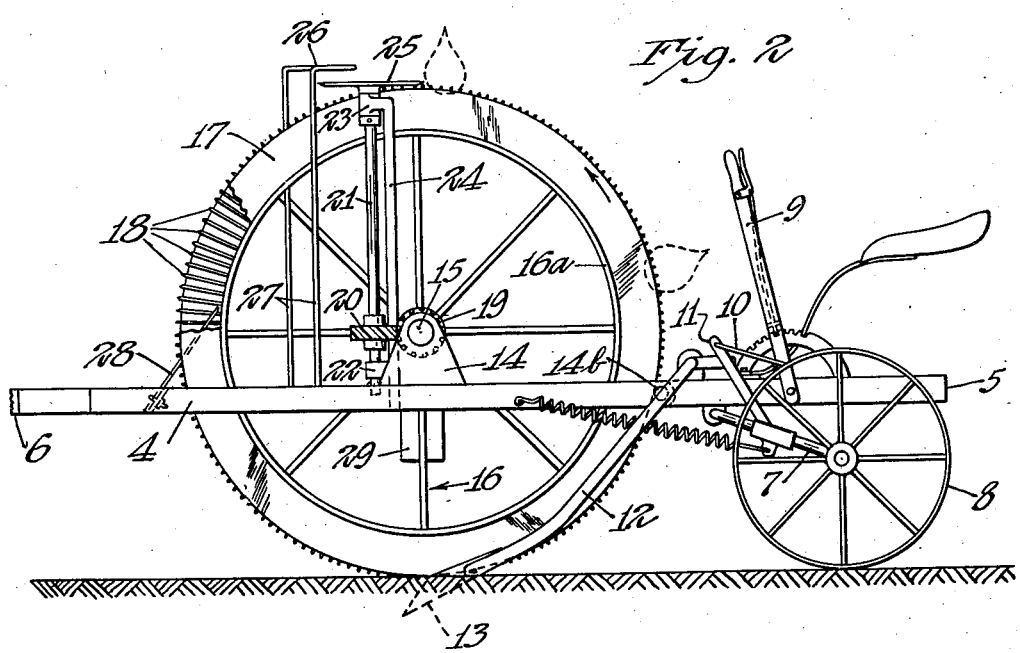
Fig. 2 is a side elevation with part of the pickup mechanism broken away.
Figure 3:
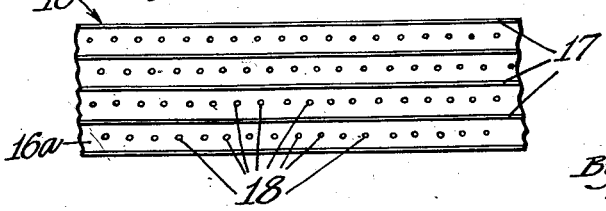
Fig. 3 is an enlarged fragmentary detail of a portion of the pickup mechanism.

As shown in Figs. 1 and 2 I provide a pair of side frame members 4 connected by a rear cross member 5 and connected at their front ends to a suitable drawbar 6. The rear portion of the frame is supported by an axle 7 upon which wheels 8 are mounted. The axle is of crank-like form so that it can be raised and lowered by means of a hand lever 9 which is connected to the axle by links 10 and 11. A tension spring connects the pivoted axle 7 with the left-hand side frame member 4. This is a conventional form of vertical wheel adjustment for farm machinery.

Extending downwardly and forwardly from intermediate portions of the frame side members 4 are arms 12 which carry blades 13 adapted to travel through the ground beside and beneath the beets to engage and uproot them as the machine moves along the row.

A pair of bearing members 14 are mounted on a sub frame member 14a to rotatably support an axle 15 upon which is mounted a relatively large wheel 16 having a relatively wide flat metallic band or tire 16a. The sub frame 14a is shown pivoted to the main side frame members at 14b. Extending radially outwardly from the wheel band or tire 16a is a plurality of spaced circular blades 17 whose outer edges are sharp. Between the blades 17 are radially extending sharpened spikes or tines 18 which, as shown in Fig. 2, extend outwardly beyond the edges of the circular blades 17.

The axle 15 carries a gear 19 which is in mesh with a gear 20 on a vertically extending shaft 21. The shaft 21 is journalled between a lower bearing 22 and an upper bearing 23 which is in turn mounted on a vertical post 24 extending upwardly from the near side member 4, as viewed in Figs. 1 and 2. The upper end of the shaft 21 carries a disc-like topping knife 25 which lies over the ends of the spikes or tines 14 at the upper portion of the wheel 16 and is adapted to rotate in a clockwise direction as the machine moves over the ground. A beet deflector rod 26 overlies a portion of the topping knife 25 and is supported by vertical members 27 which extend downwardly to opposite side frame members 4.

In operation the apparatus is drawn along a row of beets and as it progresses the uprooting blades 13 engage the lower portions of the beet and partially lift them from the ground. This brings the beets into engagement with the circular knives 17 on the wheels 16 and also the spikes or tines 18 between said knives 17. The upper portion of a sugar beet is fairly soft and the relatively closely spaced knives 17 will penetrate said soft beet top. Beneath the soft top of the beet is a hard crown, and when the closely spaced knives 17 encounter this crown they will not slice through it but will stop at that point. The sharpened spikes 18, however, will partially penetrate or pierce the hard crown of the beet and impale the beet thereon so that as the wheel continues to rotate it will pick up the beet and carry it around to the upper side of the wheel where it will be engaged by the topping knife 25 and slice the top of the beet from the main body thereof. The main portion of the beet after being topped is engaged by the deflector bar 26 so that it is shifted from the path of movement of the wheel 16 and may conveniently drop into a sack or onto a conveyor as desired. The top of the beet which is still impaled on the spikes 18 will be carried around until engaged by cleaning fingers 28 which extend between the knives 17 from the forward portion of the subframe 14a.

It will be noted that a part of the weight of the device is supported by the wheel 16. This insures proper penetration of the beet by the blades 17 and spikes 18. If desired the weight imposed by the wheel on the beet can be varied by means of conveniently located removable weights 29 to suit different harvesting conditions. One such weight is shown hung on the axle 15.

It has been found that a harvester of the type disclosed will remove beets from the ground without waste and will accurately top the beets at substantially the same point on each beet, and the harvested crop will be free of large clods of dirt which are picked up in great quantities by conventional beet harvesters in use today. The structure is relatively simple and there is no delicate mechanism which needs frequent attention. When transporting the device along a roadway or the like the rear wheels 8 can be lowered so that the beet harvester wheel 16 can be carried out of contact with the road surface.

It will, of course, be understood that various changes may be made in the form, details, arrangement and proportions of the various parts without departing from the scope of my invention.

What I claim is:

1. In a beet harvester, a beet top penetrating element, a crown piercing element adjacent to and extending beyond said penetrating element, said elements being supported for movement as a unit to engage beets in the ground, said piercing element being capable of readily entering the hard crown of the beet, said penetrating element having a degree of sharpness sufficient to penetrate the beet leaves and the bases of the leaf stems but insufficient to materially penetrate the hard crown of the beet, and a relatively rigidly supported plow located closely beneath the penetrating and piercing unit.

2. In a beet harvester, a beet top penetrating element, a crown piercing element adjacent to and extending beyond said penetrating element, said elements being supported for movement along the ground to engage the tops of beets in the ground and having their beet top penetrating and piercing portions directed downwardly, and a plow located closely beneath the penetrating and piercing unit.

3. In a beet harvester, a set of relatively closely spaced blades mounted for rotation about a horizontal axis, said blades having outwardly disposed edged portions, a plurality of spike-like elements mounted adjacent said blades and extending beyond the edged portions of said blades from the rotational axis thereof, and a plow located relatively closely beneath the downwardly disposed portions of said blades and spike-like elements, the blades and spike-like elements being arranged to move across the ground and contact the upper portions of beets in the ground and said plow being arranged to move in conjunction therewith through the ground to uproot the beets.

4. In a beet harvester, a set of closely spaced circular blades rotatable about a horizontal axis and adapted to move across the ground, a plurality of spike-like elements supported for rotary movement with said blades and extending outwardly beyond the edges of said blades, and a plow adapted to move through the ground and located relatively closely beneath the blades and spike-like elements.

5. The structure in claim 4, and a beet topping knife extending across said set of blades at a point somewhat above the ground and positioned closely adjacent the outer edges of said blades.

ROBERT L. BOWMAN.